United States Patent
Ge et al.

(10) Patent No.: US 9,664,084 B2
(45) Date of Patent: May 30, 2017

(54) EMISSION REDUCTION SYSTEM

(71) Applicant: Caterpillar Inc., Peoria, IL (US)

(72) Inventors: Xinyu Ge, Peoria, IL (US); Yun Guo, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/861,367

(22) Filed: Sep. 22, 2015

(65) Prior Publication Data
US 2017/0082002 A1    Mar. 23, 2017

(51) Int. Cl.
*F01N 3/00* (2006.01)
*F01N 3/20* (2006.01)
*B01D 53/94* (2006.01)

(52) U.S. Cl.
CPC ......... *F01N 3/208* (2013.01); *B01D 53/9459* (2013.01); *B01D 53/9495* (2013.01); *F01N 2610/02* (2013.01); *F01N 2610/144* (2013.01); *F01N 2610/1406* (2013.01); *F01N 2610/146* (2013.01); *F01N 2610/1493* (2013.01)

(58) Field of Classification Search
CPC ............... F01N 3/2066; F01N 3/208; F01N 2900/1808; F01N 2900/1822; F01N 2610/02; F01N 2610/144; F01N 2610/1493; F01N 2610/1406; F01N 2610/146; F01N 2900/0414; Y02T 10/24; B01D 53/9495; B01D 53/9459

USPC .................................. 60/286, 289, 301, 303
See application file for complete search history.

(56) References Cited

U.S. PATENT DOCUMENTS

| | | | |
|---|---|---|---|
| 8,359,833 B2 | 1/2013 | Nalla et al. | |
| 8,459,012 B2* | 6/2013 | Sun ................................ | 60/274 |
| 8,931,259 B2 | 1/2015 | Yan et al. | |
| 8,959,899 B2 | 2/2015 | Habumuremyi et al. | |
| 2005/0252201 A1 | 11/2005 | Lecea et al. | |
| 2010/0122521 A1 | 5/2010 | Sun et al. | |
| 2012/0160934 A1 | 6/2012 | Ponnathpur et al. | |
| 2013/0055701 A1* | 3/2013 | Yan ......................... | F01N 3/208 60/287 |
| 2014/0053537 A1* | 2/2014 | Yan ....................... | F01N 3/2066 60/286 |
| 2015/0013309 A1 | 1/2015 | Upadhyay et al. | |
| 2015/0047321 A1 | 2/2015 | Cruz | |
| 2015/0052878 A1 | 2/2015 | Qi | |

* cited by examiner

*Primary Examiner* — Thai Ba Trieu
*Assistant Examiner* — Diem Tran (57) ABSTRACT

An emission reduction system is provided. The emission reduction system includes a tank configured to store a reductant. The emission reduction system also includes a pump configured to draw the reductant from the tank and supply the reductant to an exhaust system. The pump is further configured to draw in air from an ambient air source. The emission reduction system further includes a control assembly disposed in fluid communication with the ambient air source and the pump. The control assembly is configured to selectively allow the pump to access the ambient air source for purging the pump.

19 Claims, 4 Drawing Sheets

EMISSION REDUCTION SYSTEM

TECHNICAL FIELD

The present disclosure relates to an emission reduction system, and more particularly to a system and a method of purging components of the emission reduction system.

BACKGROUND

An exhaust system associated with an engine may include an emission reduction system for delivery of a reductant into an exhaust stream exiting the engine. The emission reduction system may include various components, such as a tank for storing the reductant, a pump, a reductant dispensing device, and reductant delivery conduits. The reductant delivery conduits may provide fluid communication between the components of the emission reduction system for passing the reductant therethrough. The reductant from the tank may be supplied to the reductant injector via the pump.

After engine shutdown, some quantity of the reductant may be retained within the components of the emission reduction system located downstream of the reductant tank with respect to a reductant flow direction. The reductant is susceptible to freezing in cold environments. For machines operating in relatively cold environments, the reductant retained within the components of the emission reduction system may freeze, which may in turn affect performance of the exhaust system. Therefore, exhaust systems may benefit from an ability to purge the components of the emission reduction system.

US Published Application Number 2015/0047321, hereinafter referred to as '321 reference, describes a system and method for delivering a vehicular fluid to a component of the vehicle. A reductant delivery system of a selective catalytic reduction system delivers the vehicular fluid to the component of the vehicle. The reductant delivery system includes a compressed air source, a tank in fluid communication with the compressed air source, a dosing module in fluid communication with the tank, and a control module electrically coupled to the compressed air source. The tank may contain a diesel exhaust fluid and the dosing module is in fluid communication with the component that receives the diesel exhaust fluid. The control module regulates an amount of air pressure in the tank to deliver the vehicular fluid to the dosing module. The system omits a vehicular fluid pump such that the compressed air from the compressed air source pressurizes the dosing module with the vehicular fluid.

The reductant delivery system described in the '321 reference relies on the compressed air source for supplying the compressed air to perform purging operations. Such usage of the compressed air for purging operations may deplete compressed air in the compressed air source. Thus, a high capacity compressed air source may have to be associated with the reductant delivery system, which in turn may increase overall cost associated with the reductant delivery system.

SUMMARY OF THE DISCLOSURE

In one aspect of the present disclosure, an emission reduction system is provided. The emission reduction system includes a tank configured to store a reductant. The emission reduction system also includes a pump configured to draw the reductant from the tank and supply the reductant to an exhaust system. The pump is further configured to draw in air from an ambient air source. The emission reduction system further includes a control assembly disposed in fluid communication with the ambient air source and the pump. The control assembly is configured to selectively allow the pump to access the ambient air source for purging the pump.

In another aspect of the present disclosure, a method of purging a pump of an emission reduction system is provided. The method includes checking for one or more of a pressure of compressed air in a compressed air source and a volume of the compressed air in the compressed air source. The method also includes generating one of an active purging signal and a passive purging signal based on one or more of the pressure and the volume of the compressed air in the compressed air source. The method further includes selectively purging the pump using an ambient air source based on the active purging signal. The method includes selectively purging the pump using the compressed air source based on the passive purging signal.

In yet another aspect of the present disclosure, an engine is provided. The engine includes an exhaust system. The engine also includes a compressed air source disposed in fluid communication with the exhaust system. The engine also includes an emission reduction system. The emission reduction system includes a tank configured to store a reductant. The emission reduction system also includes a pump configured to draw the reductant from the tank. The pump is further configured to draw in air from an ambient air source. The emission reduction system further includes a dispensing device configured to dispense the reductant, from the pump, in the exhaust system using the compressed air source. The emission reduction system includes a control assembly disposed in fluid communication with the ambient air source and the pump, wherein the control assembly is configured to selectively allow the pump to access the ambient air source for purging the pump.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
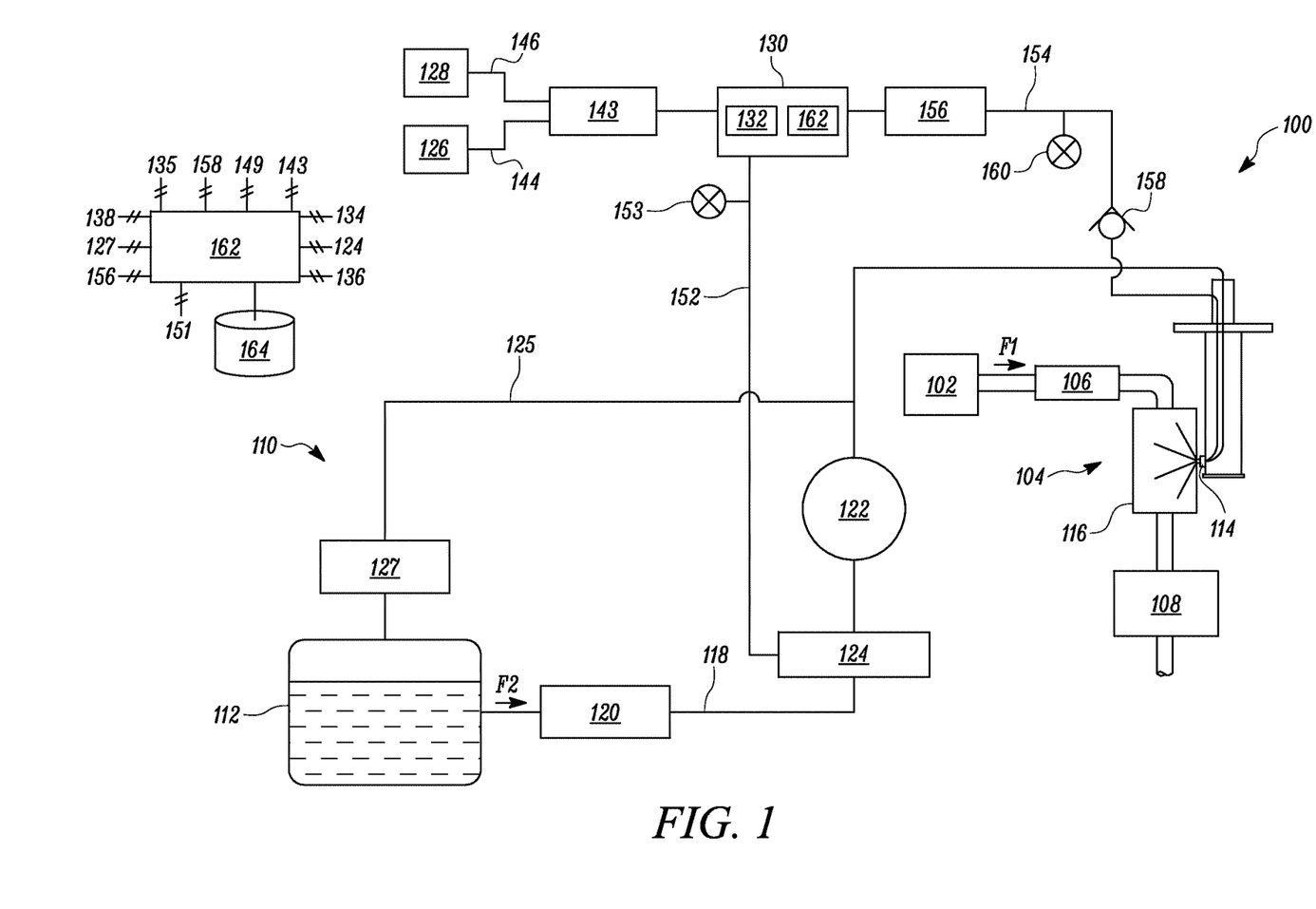
FIG. 1 is a schematic representation of an engine system having an exhaust system and an emission reduction system, according to an embodiment of the present disclosure.

FIG. 1 illustrates a schematic block diagram of an engine system 100. The engine system 100 includes an engine 102. The engine 102 may be an internal combustion engine, such as a reciprocating piston engine. Further, the engine 102 may be a spark ignition engine or a compression ignition engine, such as a diesel engine, a homogeneous charge compression ignition engine, a reactivity controlled compression ignition engine, or any other compression ignition engine known in the art. The engine 102 may be fueled by one or a combination of gasoline, diesel fuel, biodiesel, dimethyl ether, alcohol, natural gas, propane, or any other combustion fuel known in the art.

The engine 102 may include other components (not shown) such as, a fuel system, an intake system, a drivetrain including a transmission system, etc. The engine 102 may be used to power a machine including, but not limited to, an on-highway truck, an off-highway truck, an earth moving machine, an electric generator, etc. Further, the engine system 100 may be associated with an industry including, but not limited to, transportation, construction, agriculture, forestry, power generation, and material handling.

The engine system 100 includes an exhaust system 104. The exhaust system 104 is in fluid communication with an exhaust manifold (not shown) of the engine 102. The exhaust system 104 treats exhaust gases exiting from the exhaust manifold of the engine 102. The exhaust gases contain emission compounds that may include Nitrogen Oxides (NOx), unburned hydrocarbons, particulate matter, and/or other combustion products known in the art. The exhaust system 104 may trap or convert NOx, unburned hydrocarbons, particulate matter, or its combinations, or other combustion products in the exhaust gases before exiting the engine system 100.

The exhaust system 104 includes a filter, such as, for example, a Diesel Particulate Filter (DPF) 106. The DPF 106 may be coated with a suitable catalyst to promote oxidation of any particulate matter present in the exhaust gases that may be trapped in the DPF 106. Additionally, in another aspect, the exhaust system 104 may also include a diesel oxidation catalyst (not shown). In such an aspect, the diesel oxidation catalyst may be positioned downstream of the DPF 106, with respect to an exhaust gas flow direction 'F1'.

The exhaust system 104 also includes a Selective Catalytic Reduction (SCR) module 108. The SCR module 108 is positioned downstream of the DPF 106, with respect to the exhaust gas flow direction 'F1'. The SCR module 108 reduces a concentration of NOx in the exhaust gases. The SCR module 108 may include a catalyst for facilitating the reaction, reduction, or removal of NOx from the exhaust gases passing through the SCR module 108. The SCR module 108 may have a honeycomb or other structure made from or coated with an appropriate material. The material may be an oxide, such as vanadium oxide or tungsten oxide, coated on an appropriate substrate, such as titanium dioxide. The SCR module 108 may have a monolithic structure or may include multiple banks based on system requirements. In one example, the exhaust system 104 may omit the DPF 106 and include only the SCR module 108. In another example, a combined DPF/SCR catalyst (not shown) may be used, without any limitations.

Further, the exhaust system 104 may include one or more NOx sensors (not shown). The NOx sensors may be located at varying locations within the exhaust system 104. For example, the NOx sensors may be located upstream and/or downstream of the SCR module 108, with respect to the exhaust gas flow direction 'F1'. The NOx sensors may be configured to measure the concentration of NOx compounds in the exhaust gases passing through the exhaust system 104. Similarly, other additional sensors, such as, a pressure sensor and a temperature sensor may also be included in contact with the exhaust gases, without any limitation.

The exhaust system 104 disclosed herein, is provided as a non-limiting example. It will be appreciated that the exhaust system 104 may be disposed in various arrangements and/or combinations relative to the exhaust manifold. These and other variations in exhaust system design are possible without deviating from the scope of the disclosure.

Further, the engine system 100 includes an emission reduction system 110. The emission reduction system 110 dispenses a reductant in the exhaust gases, before the exhaust gases enter the SCR module 108. As shown in FIG. 1, the emission reduction system 110 includes a tank 112 to store a reductant. The reductant may be a fluid, such as, Diesel Exhaust Fluid (DEF). Alternatively, the reductant may include urea, ammonia, or other reducing agent known in the art. Parameters related to the tank 112 such as size, shape, location, and material used may vary according to system design and requirements.

Further, the emission reduction system 110 includes a dispensing device 114. The dispensing device 114 injects the reductant into the exhaust gases flowing through a mixing chamber 116. In an embodiment, the dispensing device 114 may include one or more pairs of the injectors. The number of the injectors may vary based on the type of application. Alternatively, the dispensing device 114 may embody a nozzle. Further, the mixing chamber 116 may include a number of mixing elements (not shown) positioned within the mixing chamber 116 to uniformly mix the reductant with the exhaust gases.

A supply conduit 118 provides fluid communication between the tank 112 and the dispensing device 114. The reductant drawn from the tank 112 is delivered to the dispensing device 114, via the supply conduit 118. An in-line filter 120 is disposed along the supply conduit 118. The in-line filter 120 is disposed downstream of the tank 112 with respect to a direction of flow of the reductant 'F2'. The in-line filter 120 disclosed herein, may be any type of filter known in the art. During a reductant dosing operation, a controller, such as an Electronic Control Module (ECM) of the machine may send a control signal to open the dispensing device 114 for a predetermined time period in order to allow the reductant to be injected into the exhaust gases.

The emission reduction system 110 includes a pump 122. The pump 122 is positioned in the supply conduit 118. An inlet portion of the pump 122 is in selective fluid communication with the tank 112, whereas an outlet portion of the pump 122 is in selective fluid communication with the dispensing device 114. The pump 122 pressurizes the reductant from the tank 112 and supplies the pressurized reductant to the dispensing device 114. Further, the emission reduction system 110 includes a valve assembly 124 positioned in the supply conduit 118. More particularly, the valve assembly 124 is positioned between the in-line filter 120 and the pump 122.

The valve assembly 124 disclosed herein, may be any type of a known 3-way, 2-position valve that provides selective fluid communication between the tank 112 and the pump 122. In one example, the valve assembly 124 may be a 3-way, 2-position ball valve. Alternatively, the valve assembly 124 may be a 3-way, 3-position valve. The valve assembly 124 is operated in a first configuration during the reductant dosing operation. In the first configuration, the valve assembly 124 provides fluid communication between the tank 112 and the pump 122. Further, the valve assembly 124 is operated in a second configuration during a reductant purging operation. In the second configuration, the valve assembly 124 provides fluid communication between an ambient air source 126 or a compressed air source 128 and the pump 122.

The emission reduction system 110 also includes a return passageway 125. The return passageway 125 provides fluid communication between the supply conduit 118 ahead of the pump 122 and the tank 112. A return valve 127 is provided along the return passageway 125 to ensure a unidirectional flow. The return valve 127 allows the reductant to flow back to the tank 112 during a reductant purging operation and prevents a flow of the reductant back to the tank 112 during the reductant dosing operation.

During the reductant purging operation, the compressed air source 128 selectively supplies compressed air for purging of the pump 122 and the dispensing device 114. In one example, the compressed air source 128 may embody a storage pressure vessel with compressed air stored at a pre-defined pressure and volume. Alternatively, the compressed air source 128 may embody an air compressor that compresses ambient air to the pre-defined pressure. The air compressor may be any type of known positive displacement compressor or a turbo machine. Alternatively, the compressed air source 128 may be any other component serving the purpose of supplying the compressed air. Further, the ambient air source 126 selectively supplies ambient air for purging of the pump 122. The ambient air source 126 may embody any element that is capable of supplying the ambient air.

Some quantity of the reductant may be retained in the components of the exhaust system 104. For example, the reductant may be retained in the reductant lines, such as, the supply conduit 118, the pump 122, and the dispensing device 114. The emission reduction system 110 includes a control assembly 130 for purging the components of the emission reduction system 110. The control assembly 130 is in fluid communication with the compressed air source 128, the ambient air source 126, and the pump 122. The control assembly 130 purges the pump 122, the dispensing device 114, or both, based on an operation of the compressed air source 128. Further, the control assembly 130 effects fluid communication between the pump 122 and the ambient air source 126, for purging of the pump 122 using the ambient air.

Figure 2:
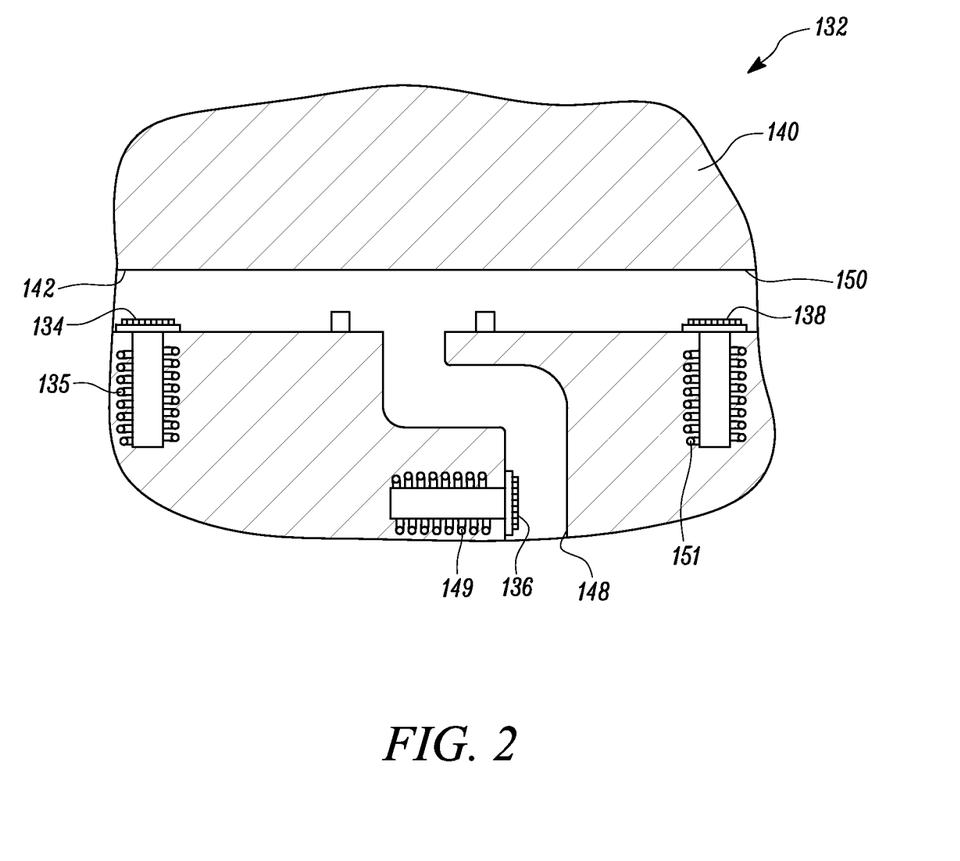
FIG. 2 is a sectional representation of a control assembly associated with the emission reduction system, according to an embodiment of the present disclosure.

FIG. 2 is a schematic view of a valve unit 132 of the control assembly 130. The valve unit 132 may include a combination of valves, i.e., a first valve 134, a second valve 136, and a third valve 138. The first valve 134, the second valve 136, and the third valve 138 are provided within a body 140.

Referring to FIGS. 1-2, the body 140 includes an inlet port 142. In one example, a valve 143 may allow fluid communication of one of the ambient air source 126 and the compressed air source 128 with the inlet port 142. A conduit 144 may provide fluid communication between the inlet port 142 and the ambient air source 126. Further, the compressed air source 128 is in fluid communication with the inlet port 142 via a conduit 146.

The first valve 134 opens and closes the inlet port 142 during the reductant purging operation. An actuator 135 effectuates a movement of the first valve 134. In one example, the first valve 134 may act as a pressure regulator to relieve pressure spikes near the inlet port 142. In other embodiments, the body 140 may include an additional inlet port, such that the two inlet ports are in fluid communication with the ambient air source 126 and the compressed air source 128.

The body 140 also includes a first outlet port 148 and a second outlet port 150. The second valve 136 and the third valve 138 respectively open and close the first outlet port 148 and the second outlet port 150 during the reductant purging operation. An actuator 149 effectuates a movement of the second valve 136. Further, an actuator 151 effectuates a movement of the third valve 138. The first outlet port 148 is in fluid communication with the pump 122 via a conduit 152. A pressure sensor 153 is disposed in the conduit 152 to measure the pressure of a fluid flowing through the conduit 152.

Further, the second outlet port 150 is in fluid communication with the dispensing device 114, via a conduit 154. A first valve element 156 is positioned in the conduit 154. The first valve element 156 is embodied as a shut off valve. Further, a second valve element 158 is positioned in the conduit 154. The second valve element 158 is positioned between the first valve element 156 and the dispensing device 114. The second valve element 158 ensures unidirectional flow in the conduit 154, from the second outlet port 150 towards the dispensing device 114. A pressure sensor 160 is disposed between the first valve element 156 and the second valve element 158. The pressure sensor 160 determines the pressure in the conduit 154.

Referring back to FIG. 1, the control assembly 130 also includes a controller 162. The controller 162 is communicably coupled to the actuator 135, the actuator 149, the actuator 151, the valve assembly 124, the valve 143, the first valve 134, the second valve 136, the third valve 138, the return valve 127, the first valve element 156, and the second valve element 158. Each of the valve assembly 124, the valve 143, the first valve 134, the second valve 136, the third valve 138, the return valve 127, the first valve element 156, and the second valve element 158 opens or closes based on signals received from the controller 162. The controller 162 controls one or more of the valve assembly 124, the valve 143, the first valve 134, the second valve 136, the third valve 138, the return valve 127, the first valve element 156, and the second valve element 158 for selectively purging the pump 122 and/or the dispensing device 114, using the compressed air source 128. Additionally, the controller 162 controls one or more of the valve assembly 124, the valve 143, the first valve 134, the second valve 136, the third valve 138, the return valve 127, the first valve element 156, and the second valve element 158 for allowing the pump 122 to access the ambient air source for purging of the pump 122.

In one example, the controller 162 may receive a signal indicative of a pressure of the compressed air stored in the compressed air source 128 from suitable pressure detection means (not shown). In another example, the controller 162 may also receive a signal indicative of a volume of the compressed air flowing through the compressed air source 128. In one example, the controller 162 may determine the volume of the compressed air through the compressed air source 128 based on the pressure and temperature of the compressed air flowing through the compressed air source 128. The controller 162 is also communicably coupled with the pressure sensors 153, 160, and is configured to receive signals therefrom.

The controller 162 is communicably coupled to a memory 164. The memory 164 may store values corresponding to a first threshold pressure and a first threshold volume. Based on the receipt of signals corresponding to the pressure and/or the volume of the compressed air present in the compressed air source 128, the controller 162 is configured to retrieve information pertaining to the first threshold pressure and/or the first threshold volume from the memory 164. The controller 162 may compare the values of the pressure of the compressed air in the compressed air source 128 with the first threshold pressure and/or the volume of the compressed air in the compressed air source 128 with the first threshold volume, received from the memory 164.

In another embodiment, the controller 162 also retrieves information corresponding to a second threshold pressure and a second threshold volume from the memory 164. Values of the second threshold pressure and second threshold volume are different from the values of the first threshold pressure and the first threshold volume stored in the memory 164.

Further, during the reductant purging operation of the pump 122, the valve assembly 124 is operated in the second configuration so that one of the compressed air source 128 or the ambient air source 126 is in fluid communication with the pump 122 via the valve unit 132 and the valve assembly 124. For purging the reductant from the dispensing device 114, the first valve element 156 and the second valve element 158 are operated in open positions so that at least one of the compressed air source 128 or the ambient air source 126 is in fluid communication with the dispensing device 114 via the valve unit 132.

The location of the memory 164 may vary based on the application. The predetermined thresholds stored in the memory 164 may be retrieved from any external source(s) and/or updated on a real time basis. Moreover, the memory 164 may be capable of storing and/or modifying pre-stored data as per operational and design needs.

The controller 162 may embody a single microprocessor or multiple microprocessors for receiving signals from components of the engine system 100. Numerous commercially available microprocessors may be configured to perform the functions of the controller 162. It should be appreciated that the controller 162 may embody a machine microprocessor capable of controlling numerous machine functions. A person of ordinary skill in the art will appreciate that the controller 162 may additionally include other components and may also perform other functions not described herein.

INDUSTRIAL APPLICABILITY

When the reductant is exposed to elevated temperature, urea present in the reductant decomposes to form deposits that clog the components of the emission reduction system. The purging operation of the dispensing device can effectively avoid the clogging of the dispensing device and the pump of the emission reduction system. Typically, the purging operation requires compressed air assistance for purging operation of the pump. However, in the active purging operation of the present disclosure, the pump is purged without the compressed air, thereby avoiding depletion of the compressed air from the compressed air source.

Figure 3:
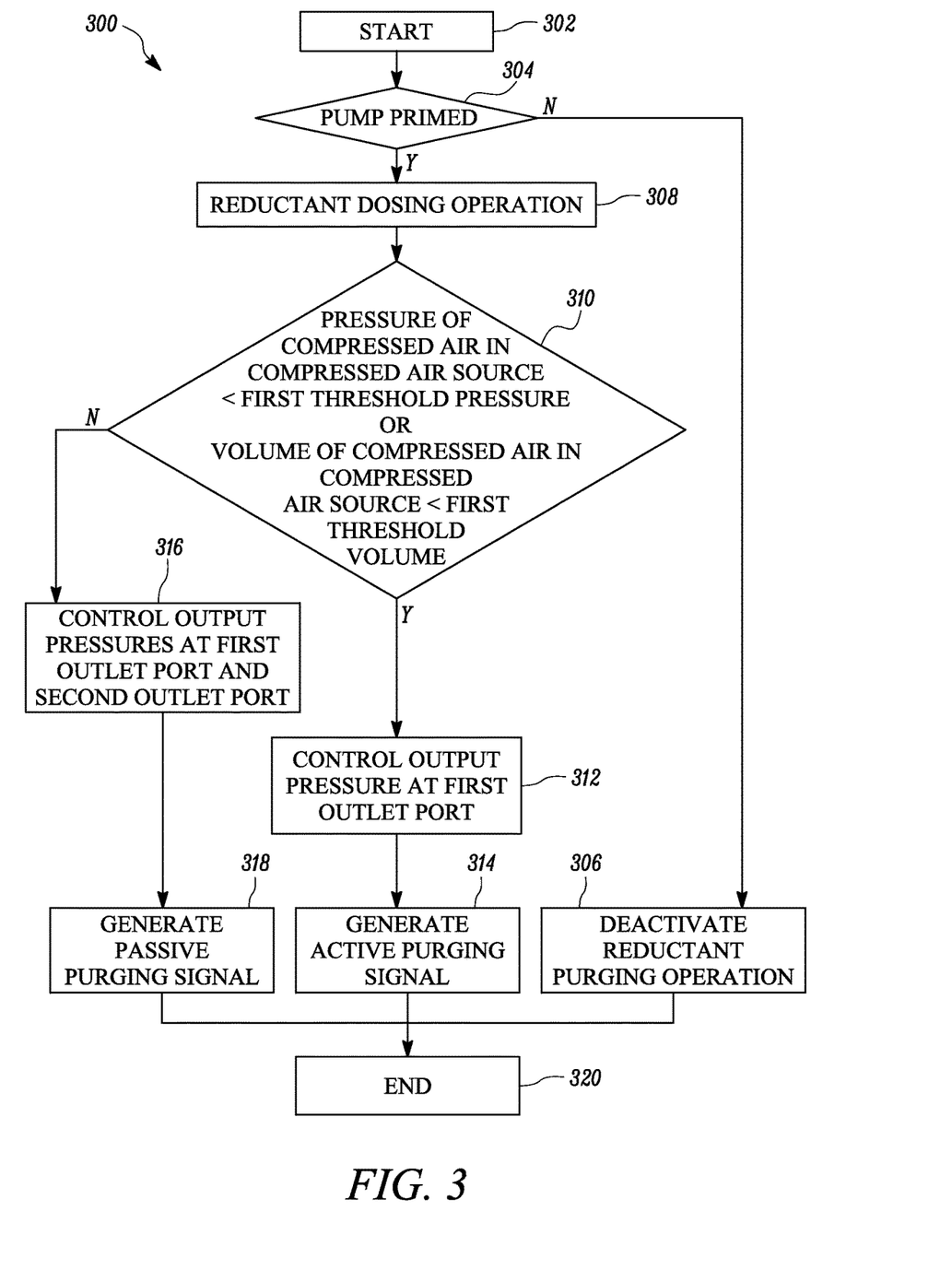
FIG. 3 is a flowchart for a method of purging a pump of the emission reduction system, according to an embodiment of the present disclosure.

In an embodiment, FIG. 3 illustrates a process 300 that may be stored in the memory 164 and implemented by the controller 162 in order to control the reductant purging operation of the pump 122 and the dispensing device 114. Alternatively, the process 300 may also be stored in a memory of the ECM present on-board the machine, and may be retrieved by the controller 162 therefrom. The process 300 (or algorithm) begins at block 302 in which the method implemented by the controller 162 or the ECM starts or begins operation. The reductant purging operation may be carried out in three modes, i.e., an active purging mode, a passive purging mode, or a deactivation of the purging operation. It should be noted that the activation of the reductant purging operation may be manual, and an operator of the machine may activate the controller 162 to start the reductant purging operation, based on operational requirements. Alternatively, the controller 162 may automatically activate the reductant purging operation, based on signals received from the ECM or from various sensors present on-board the machine.

At block 304, the controller 162 determines whether the pump 122 is primed. If the controller 162 determines that the pump 122 is not primed, the process 300 moves to block 306. At block 306, the process 300 sends signals to the controller 162 to deactivate the reductant purging operation. However, if the controller 162 determines that the pump 122 is primed, the process 300 moves to block 308. At block 308, the reductant may be optionally dosed in the mixing chamber 116 by the dispensing device 114. During the reductant dosing operation, the valve assembly 124 operates in the first configuration such that the valve assembly 124 effects fluid communication between the tank 112 and the dispensing device 114 through the supply conduit 118. Further, based on an operation of the pump 122, the reductant present in the tank 112 enters into the supply conduit 118. The reductant may flow through the in-line filter 120, and into the dispensing device 114. The reductant may further be introduced by the dispensing device 114 into the mixing chamber 116.

After the reductant dosing operation, the process 300 moves to block 310. At block 310, the controller 162 compares the pressure in the compressed air source 128 with the first threshold pressure received from the memory 164. In another example, the controller 162 also compares the volume of the compressed air stored in the compressed air source 128 with the first threshold volume received from the memory 164. Alternatively, at block 310, the controller 162 compares the value of both the pressure and the volume of the compressed air in the compressed air source 128 with the second threshold pressure and the second threshold volume, respectively.

In a situation where either the pressure or the volume of the compressed air stored within the compressed air source 128 is less than the first threshold pressure and the first threshold volume respectively, the process 300 moves to block 312. Further, the process 300 moves to block 312 when both the pressure and the volume of the compressed air stored in the compressed air source 128 are less than the corresponding second threshold pressure and the second threshold volume. At block 312, the controller 162 controls the output pressure at the first outlet port 148. The output pressure is controlled based on feedback received from the pressure sensor 153. The output pressure is controlled by controlling the first valve 134. When the output pressure is within a desired pressure range, the process 300 moves to block 314.

At block 314, the controller 162 generates an active purging signal. Based on the generation of the active purging signal, the controller 162 activates the active purging mode of the reductant purging operation. In the active purging mode, the pump 122 is purged using the ambient air source 126. Further, the valve 143 is operated in a second configuration. In the second configuration, the valve 143 effects fluid communications between the ambient air source 126 and the inlet port 142.

In the active purging mode, the pump 122 is in fluid communication with the ambient air source 126 via the valve 143, the first valve 134, the second valve 136, and the valve assembly 124. More particularly, in the active purging mode, the purging of the pump 122 is performed based on the operation of the pump 122. The pump 122 is operated to suck in the ambient air from the ambient air source 126. The ambient air flows through the conduits 144, 152, and is introduced in the pump 122. As the pump 122 operates, the ambient air urges the reductant retained in the pump 122 towards the outlet portion of the pump 122. The mixture of reductant and the ambient air then flows through a portion of the supply conduit 118 before being introduced in the return passageway 125, as the return passageway 125 offers low resistance to reductant flowing back to the tank 112 than the pressure restriction generated by orifices of the dispensing device 114. The mixture of reductant and the ambient air returns to the tank 112, via the return valve 127.

In a situation where the pressure in the compressed air source 128 is greater than the first threshold pressure or the volume of the compressed air stored in the compressed air source 128 is greater than the first threshold volume, the process 300 moves to block 316. Alternatively, the process 300 also moves to block 316 if the pressure and the volume of the compressed air in the compressed air source 128 are greater than the corresponding second threshold pressure and the second threshold volume. At block 316, the controller 162 determines and controls the values of two output pressures. More particularly, the two output pressures correspond to the pressures at the first outlet port 148 and the second outlet port 150 respectively. The two output pressures are controlled based on feedback received from the pressure sensors 153, 160. The two output pressures are controlled by controlling the first valve 134 and the second valve 138 that act as pressure regulators. When the two outlet pressures are within a desired pressure range, the process 300 moves to block 318.

At block 318, the controller 162 generates a passive purging signal to activate the passive purging mode. In the passive purging mode, the pump 122 and optionally the dispensing device 114 are purged using the compressed air source 128. In the passive purging mode, the valve 143 is operated in a first configuration. In the first configuration, the valve 143 effects fluid communications between the compressed air source 128 and the inlet port 142. The compressed air source 128 is in fluid communication with the pump 122 via the valve 143, the first valve 134, the second valve 136, and the valve assembly 124. The compressed air from the compressed air source 128 flows through the conduits 146, 152 and is introduced in the pump 122. As the compressed air flows through the pump 122, the compressed air urges the reductant retained in the pump 122 towards the outlet portion of the pump 122. The mixture of reductant and the compressed air then flows through a portion of the supply conduit 118 before being introduced in the return passageway 125. The mixture of reductant and the compressed air returns to the tank 112, via the return valve 127.

For purging of the dispensing device 114, the third valve 138, the first valve element 156, and the second valve element 158 operate in an open position to introduce the compressed air in the dispensing device 114 via the conduit 154. As the pump 122 is non-operational during the purging operation of the dispensing device 114, the pressure in the supply conduit 118 is less than the restrictive pressure created by the orifices of the dispensing device 114. The compressed air flows in to the dispensing device 114 and urges the reductant retained in the dispensing device 114 to flow in to the supply conduit 118. The mixture of reductant and the compressed air is then introduced in the return passageway 125. Further, the mixture of the reductant and the compressed air returns to the tank 112, via the return valve 127. Further, the process 300 ends at block 320.

According to an embodiment, the control assembly 130 may realize the reductant purging operation of the dispensing device 114 alone. In such an aspect, the controller 162 may control the outlet pressure at the second outlet port 150.

Also, the third valve 138, the first valve element 156, and the second valve element 158 may be operated in the open position, whereas the second valve 136 may be in a closed position. The compressed air source 128 may supply the compressed air to the dispensing device 114 via the conduit 154. As the pump 122 is non-operational during the purging operation of the dispensing device 114, the pressure in the supply conduit 118 is less than the restrictive pressure created by the orifices of the dispensing device 114. The compressed air flows in to the dispensing device 114 and urges the reductant retained in the dispensing device 114 to flow in to the supply conduit 118. The mixture of reductant and the compressed air is then introduced in the return passageway 125. Further, the mixture of reductant and the compressed air returns to the tank 112, via the return valve 127.

Figure 4:
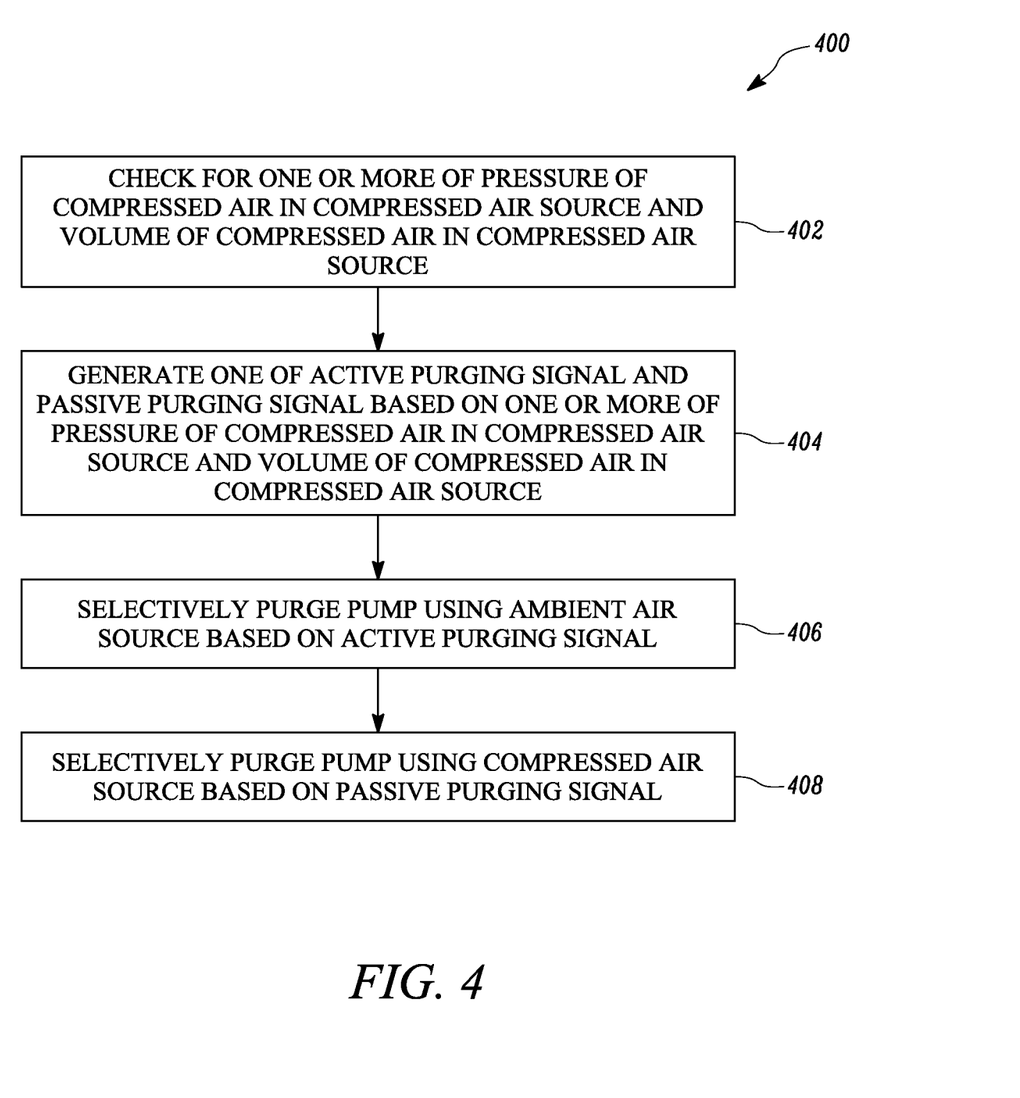
FIG. 4 is a flowchart for another method of purging the pump of the emission reduction system, according to an embodiment of the present disclosure.

In an embodiment, FIG. 4 illustrates a flowchart for a method 400 of purging the pump 122 of the emission reduction system 110. At block 402, the controller 162 checks the pressure of the compressed air in the compressed air source 128 and/or the volume of the compressed air in the compressed air source 128. At block 404, the controller 162 generates the active purging signal or the passive purging signal based on the pressure of the compressed air in the compressed air source 128 and/or the volume of the compressed air through the compressed air source 128.

The active purging signal is generated when the pressure of the compressed air through the compressed air source 128 is below the first threshold pressure or the volume of the compressed air through the compressed air source 128 is below the first threshold volume. Further, the passive purging signal is generated when the pressure of the compressed air through the compressed air source 128 is above the first threshold pressure or the volume of the compressed air in the compressed air source 128 is above the first threshold volume. Alternatively, the active purging signal is generated when the pressure of the compressed air through the compressed air source 128 is below the second threshold pressure and the volume of the compressed air in the compressed air source 128 is below the second threshold volume. Also, the passive purging signal is generated when the pressure of the compressed air through the compressed air source 128 is above the second threshold pressure and the volume of the compressed air through the compressed air source 128 is above the second threshold volume.

At block 406, the control assembly 130 selectively allows the pump 122 to access the ambient air source 126 for purging of the pump 122 based on the active purging signal. At block 408, the control assembly 130 allows selective purging of the pump 122 using the compressed air source 128 based on the passive purging signal. The pump 122 is connected with the tank 112 by the return passageway 125. The reductant from the pump 122 flows back to the tank 112 via the return passageway 125 after selective purging of the pump 122. Further, the flow of the reductant back to the pump 122 is prevented by the return valve 127 disposed in the return passageway 125.

In an embodiment, the control assembly 130 disclosed above has the capability of purging the pump 122 using both the ambient air and the compressed air from the compressed air source 128. The control assembly 130 allows easy switching between the active and passive purging modes. Based on the generation of the active purging signal, the controller 162 activates the active purging mode. In the active purging mode, the pump 122 performs the reductant purging operation using the ambient air. As the ambient air is used in the reductant purging operation for the pump 122, the need of a large sized compressed air source is reduced. Thus, overall cost associated with the emission reduction system 110 may be reduced.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An emission reduction system, comprising:
a tank configured to store a reductant;
a pump configured to:
   draw the reductant from the tank and supply the reductant to an exhaust system,
   draw in air from an ambient air source; and
a control assembly disposed in fluid communication with the ambient air source and the pump,
   wherein the control assembly is configured to selectively allow the pump to access the ambient air source for purging the pump, and
   wherein the control assembly comprises a valve unit disposed in fluid communication with a compressed air source, the ambient air source and the pump.

2. The emission reduction system of claim 1, wherein the control assembly further comprises a controller configured to:
generate an active purging signal and a passive purging signal, and
selectively allow the pump to access the ambient air source for purging the pump based on the active purging signal, and for selectively purging the pump using the compressed air source based on the passive purging signal.

3. The emission reduction system of claim 2, wherein the controller is configured to generate the active purging signal when a pressure of compressed air in the compressed air source is below a first threshold pressure, and wherein the controller is configured to generate the passive purging signal when the pressure of the compressed air in the compressed air source is above the first threshold pressure.

4. The emission reduction system of claim 2, wherein the controller is configured to generate the active purging signal when a volume of compressed air in the compressed air source is below a first threshold volume, and
wherein the controller is configured to generate the passive purging signal when the volume of the compressed air in the compressed air source is above the first threshold volume.

5. The emission reduction system of claim 2, wherein the controller is configured to generate the active purging signal when a pressure of compressed air in the compressed air source is below a second threshold pressure and when a volume of the compressed air in the compressed air source is below a second threshold volume, and
wherein the controller is configured to generate the passive purging signal when the pressure of the compressed air in the compressed air source is above the second threshold pressure and when the volume of the compressed air in the compressed air source is above the second threshold volume.

6. The emission reduction system of claim 1 further comprising a valve configured to dispose the control assembly to be in fluid communication with the pump, the valve further configured to dispose the tank to be in fluid communication with the pump.

7. The emission reduction system of claim 1 further comprising a return passageway connecting the pump and the tank,
the return passageway being configured to allow the reductant from the pump to flow back to the tank after purging of the pump.

8. The emission reduction system of claim 7 further comprising a return valve disposed on the return passageway between the pump and the tank,
the return valve being configured to prevent a flow of the reductant back to the pump in the return passageway.

9. The emission reduction system of claim 2 further comprising a dispensing device configured to dispense the reductant in the exhaust system,
wherein the control assembly is further configured to purge the dispensing device using the compressed air source.

10. A method of purging a pump of an emission reduction system, the method comprising:
checking for one or more of a pressure of compressed air in a compressed air source and a volume of the compressed air in the compressed air source;
generating one of an active purging signal and a passive purging signal based on the one or more of the pressure of the compressed air in the compressed air source and the volume of the compressed air in the compressed air source;
selectively purging the pump using an ambient air source based on the active purging signal; and
selectively purging the pump using the compressed air source based on the passive purging signal.

11. The method of claim 10, wherein the active purging signal is generated when the pressure of the compressed air in the compressed air source is below a first threshold pressure, and
wherein the passive purging signal is generated when the pressure of the compressed air in the compressed air source is above the first threshold pressure.

12. The method of claim 10, wherein the active purging signal is generated when the volume of the compressed air in the compressed air source is below a first threshold volume, and
wherein the passive purging signal is generated when the volume of the compressed air in the compressed air source is above the first threshold volume.

13. The method of claim 10, wherein the active purging signal is generated when the pressure of the compressed air in the compressed air source is below a second threshold pressure and when the volume of the compressed air in the compressed air source is below a second threshold volume, and
wherein the passive purging signal is generated when the pressure of the compressed air in the compressed air source is above the second threshold pressure and when the volume of the compressed air in the compressed air source is above the second threshold volume.

14. The method of claim 10 further comprising connecting the pump with a tank by a return passageway,
wherein a reductant from the pump flows back to the tank via the return passageway after selective purging of the pump.

15. The method of claim 14 further comprising preventing a flow of the reductant back to the pump in the return passageway using a return valve disposed in the return passageway.

16. An engine comprising:
an exhaust system;
a compressed air source disposed in fluid communication with the exhaust system; and
an emission reduction system comprising:
- a tank configured to store a reductant;
- a pump configured to draw the reductant from the tank and draw in air from an ambient air source;
- a dispensing device configured to dispense the reductant, from the pump, in the exhaust system using the compressed air source; and
- a control assembly disposed in fluid communication with the ambient air source and the pump,
    - wherein the control assembly is configured to selectively allow the pump to access the ambient air source for purging the pump, and
    - wherein the control assembly comprises a valve unit disposed in fluid communication with the compressed air source, the ambient air source and the pump.

17. The engine of claim 16, wherein the pump is configured to draw in air from the ambient air source for purging the pump.

18. The engine of claim 16, wherein the control assembly is further configured to selectively purge the pump using the compressed air source.

19. The engine of claim 16, wherein the control assembly is further configured to purge the dispensing device using the compressed air source.

* * * * *